United States Patent
Onishi

(10) Patent No.: US 8,139,237 B2
(45) Date of Patent: Mar. 20, 2012

(54) IMAGE GENERATING APPARATUS, IMAGE PROCESSING APPARATUS, RECORDING MEDIUM AND COMPUTER READABLE RECORDING MEDIUM

(75) Inventor: Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1497 days.

(21) Appl. No.: 11/594,962

(22) Filed: Nov. 9, 2006

(65) Prior Publication Data
US 2007/0285696 A1 Dec. 13, 2007

(30) Foreign Application Priority Data
Jun. 7, 2006 (JP) ................. P2006-158261

(51) Int. Cl.
*G06K 15/00* (2006.01)
(52) U.S. Cl. ......... 358/1.12; 358/1.1; 358/1.9; 358/1.15
(58) Field of Classification Search .............. 358/1.12, 358/537, 1.1, 1.15, 1.9
See application file for complete search history.

(56) References Cited

U.S. PATENT DOCUMENTS

| | | | |
|---|---|---|---|
| 5,671,277 A | 9/1997 | Ikenoue et al. | |
| 2002/0159089 A1* | 10/2002 | Wiebe et al. | 358/1.15 |
| 2004/0230802 A1* | 11/2004 | Moon | 713/176 |
| 2006/0193522 A1 | 8/2006 | Sonoda et al. | |

FOREIGN PATENT DOCUMENTS

| | | |
|---|---|---|
| JP | UM-A-3-466 | 1/1991 |
| JP | 6-22119 | 1/1994 |
| JP | 06022119 | * 1/1994 |
| JP | A-8-324023 | 12/1996 |
| JP | 2001346032 | * 12/2001 |
| JP | A-2001-346032 | 12/2001 |
| JP | 2004-528644 | 9/2004 |

OTHER PUBLICATIONS

JP06022119 English translation.*
U.S. Appl. No. 11/452,467, filed Jun. 14, 2006, Sonoda et al.

* cited by examiner

*Primary Examiner* — King Poon
*Assistant Examiner* — Iriana Cruz
(74) *Attorney, Agent, or Firm* — Morgan, Lewis & Bockius LLP

(57) ABSTRACT

An image generating apparatus includes a document-image acquiring section, an information-image acquiring section and a synthesizing section. The document-image acquiring section acquires a document image, which is a binary image formed based on an electronic document. The information-image acquiring section acquires an information image, which is a binary image formed based on predetermined information. The synthesizing section performs an exclusive OR operation between the document image and the information image to synthesize the document image and the information image.

4 Claims, 16 Drawing Sheets

FIG. 3A

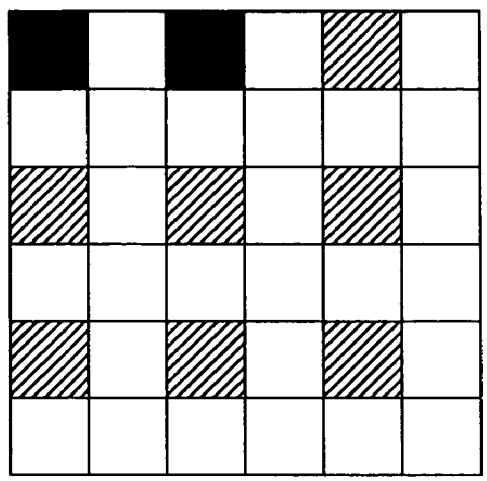

FIG. 3B

| SYNC. CODE 2bit | X-POSITION CODE (5 BITS) | X-POSITION CODE (5 BITS) | X-POSITION CODE (5 BITS) | X-POSITION CODE (5 BITS) |
|---|---|---|---|---|
| Y-POSITION CODE (5 BITS) | IDENTIFI- CATION CODE (5 BITS) | IDENTIFI- CATION CODE (5 BITS) | IDENTIFI- CATION CODE (5 BITS) | IDENTIFI- CATION CODE (5 BITS) |
| Y-POSITION CODE (5 BITS) | IDENTIFI- CATION CODE (5 BITS) | IDENTIFI- CATION CODE (5 BITS) | IDENTIFI- CATION CODE (5 BITS) | IDENTIFI- CATION CODE (5 BITS) |
| Y-POSITION CODE (5 BITS) | IDENTIFI- CATION CODE (5 BITS) | IDENTIFI- CATION CODE (5 BITS) | IDENTIFI- CATION CODE (5 BITS) | IDENTIFI- CATION CODE (5 BITS) |
| Y-POSITION CODE (5 BITS) | IDENTIFI- CATION CODE (5 BITS) | IDENTIFI- CATION CODE (5 BITS) | IDENTIFI- CATION CODE (5 BITS) | IDENTIFI- CATION CODE (5 BITS) |

FIG. 5A
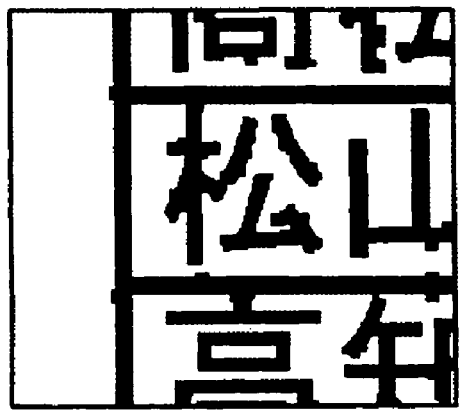
FIG. 5B
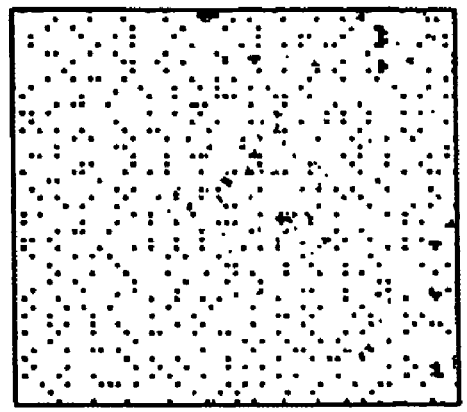
 
FIG. 5C
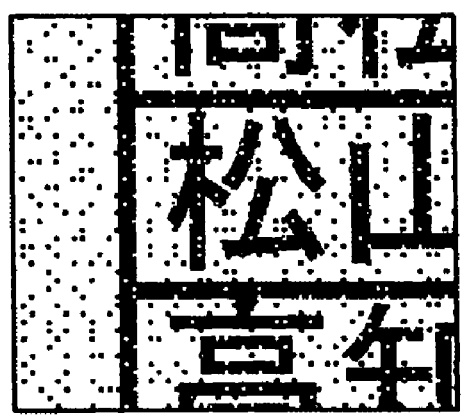

FIG. 10A
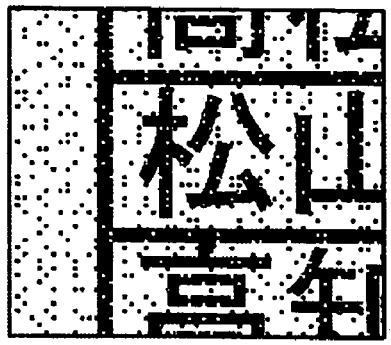
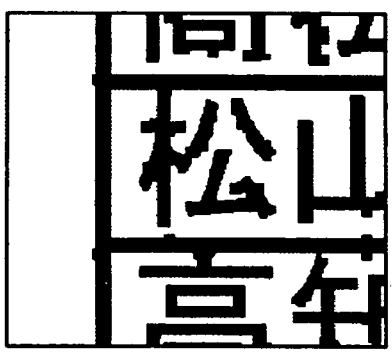
FIG. 10B
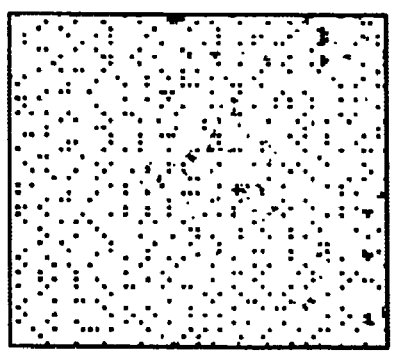
FIG. 10C

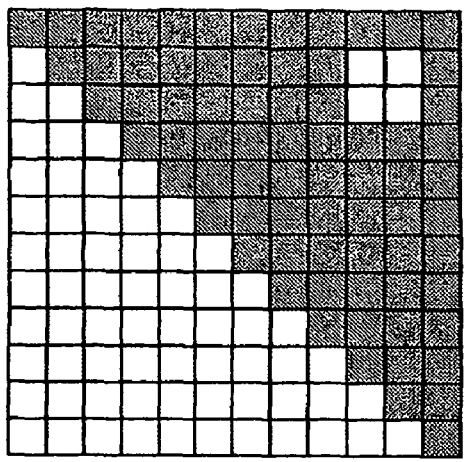
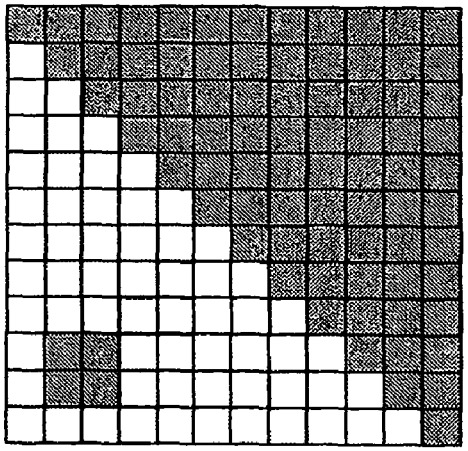
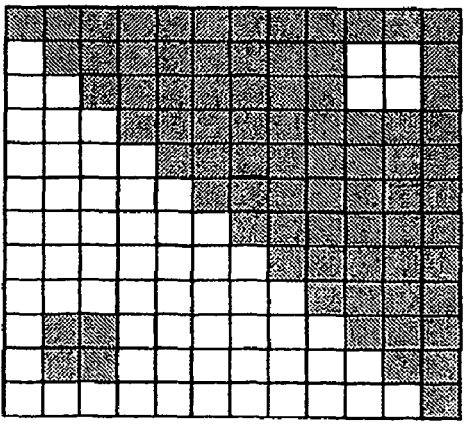
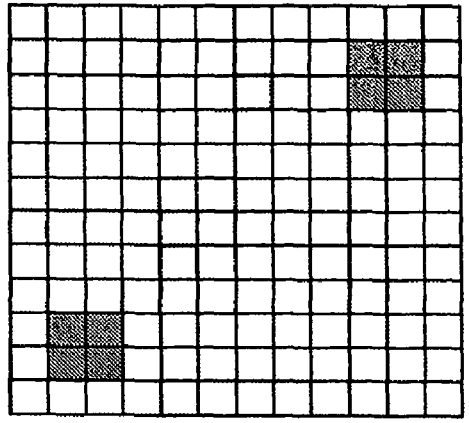
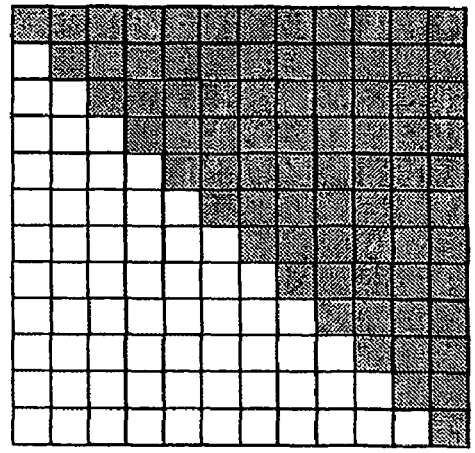
FIG. 16A
FIG. 16B
FIG. 16C
FIG. 16D
FIG. 16E

IMAGE GENERATING APPARATUS, IMAGE PROCESSING APPARATUS, RECORDING MEDIUM AND COMPUTER READABLE RECORDING MEDIUM

BACKGROUND

1. Technical Field

The invention relates to an image generating apparatus, an image processing apparatus, a recording medium and a computer readable recording medium.

2. Description of the Related Art

SUMMARY

According to an aspect of the invention, an image generating apparatus includes a document-image acquiring section, an information-image acquiring section and a synthesizing section. The document-image acquiring section acquires a document image, which is a binary image formed based on an electronic document. The information-image acquiring section acquires an information image, which is a binary image formed based on predetermined information. The synthesizing section performs an exclusive OR operation between the document image and the information image to synthesize the document image and the information image.

BRIEF DESCRIPTION OF THE DRAWINGS

Exemplary embodiment will be described in detail with reference to the accompanying drawings wherein:

FIGS. 3A and 3B are diagrams for explaining a code pattern, which is generated in accordance with the exemplary embodiment;

FIG. 5 is diagram for explaining synthesis of a document image and the code pattern image in accordance with the exemplary embodiment;

FIG. 10 is a diagram for explaining separation of the document image and the code pattern image in accordance with the exemplary embodiment;

FIG. 16 is a view for explaining an operation of a code-pattern-image generating section 83 according to the exemplary embodiment.

DETAILED DESCRIPTION

Referring now to the accompanying drawings, a description will be given on exemplary embodiments.

First, a description will be given on the system configuration according to this exemplary embodiment.

Figure 1:
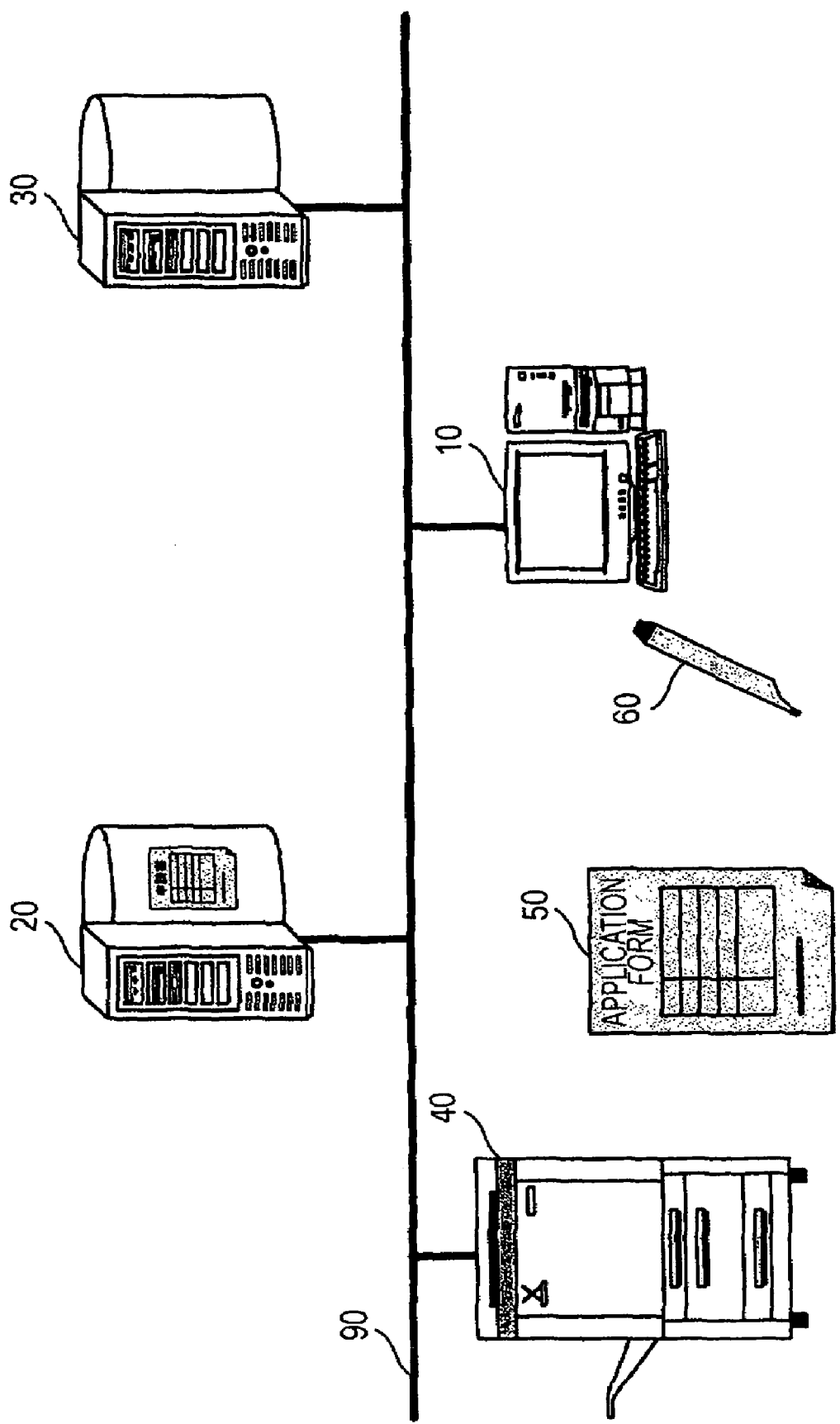
FIG. 1 is a diagram illustrating the configuration of a system to which an exemplary embodiment is applied.

FIG. 1 shows the configuration of the system to which this exemplary embodiment is applied. This system includes a terminal apparatus 10, a document server 20, an identification information server 30 and an image forming apparatus 40, which are connected via a network 90. This system further includes a print document 50 and an electronic pen 60.

The terminal apparatus 10 is used for instructing print of an electronic document. A personal computer (PC) is exemplified as this terminal apparatus 10.

The document server 20 stores electronic documents. When receiving an instruction for printing an electronic document, the document server 20 outputs an instruction for forming a superimposed image in which an image of the electronic document and a code pattern image are superimposed on each other. This document server 20 may be implemented by a general-purpose server computer.

The code pattern image is formed based on an identification code and a position code, which are obtained by encoding identification information and position information. Of these information, either one of (i) identification information for uniquely identifying a medium (e.g. a sheet of paper) and (ii) identification information for uniquely identifying the electronic document printed on the medium is adopted as the "identification information". In the case where the former identification information is adopted, if plural copies of the same electronic document are printed, pieces of different identification information are given to respective media. On the other hand, in the case where the latter identification information is adopted, if the same electronic document is printed, the same identification information is given to even different media. Also, the "position information" is information, which represents the coordinate position on a medium.

The identification information server 30 issues identification information to be given to the medium. The identification information server 30 manages the issued identification information while associating the issued identification information with an electronic document, which is printed on that medium. This identification information server 30 may be implemented by a general-purpose server computer.

The image forming apparatus 40 forms an image on the medium. Here, as the image forming process performed in the image forming apparatus 40, the electrophotographic process or any other process may be used.

The print document 50 is a medium on which the superimposed image has been printed in which the image of the electronic document and the code pattern image are superimposed on each other.

The electronic pen 60 is a pen device having a function of recording a character and/or a graphic on the print document 50.

Although the term "electronic document" is used in this specification, this term "electronic document" does not only mean data into which "a document" including a text is computerized. The term "electronic document" may include, for example, image data (irrespective of whether the image data is raster data or vector data) such as a picture, a photograph and a graphic, and other printable electronic data.

Next, a description will be given on the operation of this system when the print document 50 is generated.

Figure 2:
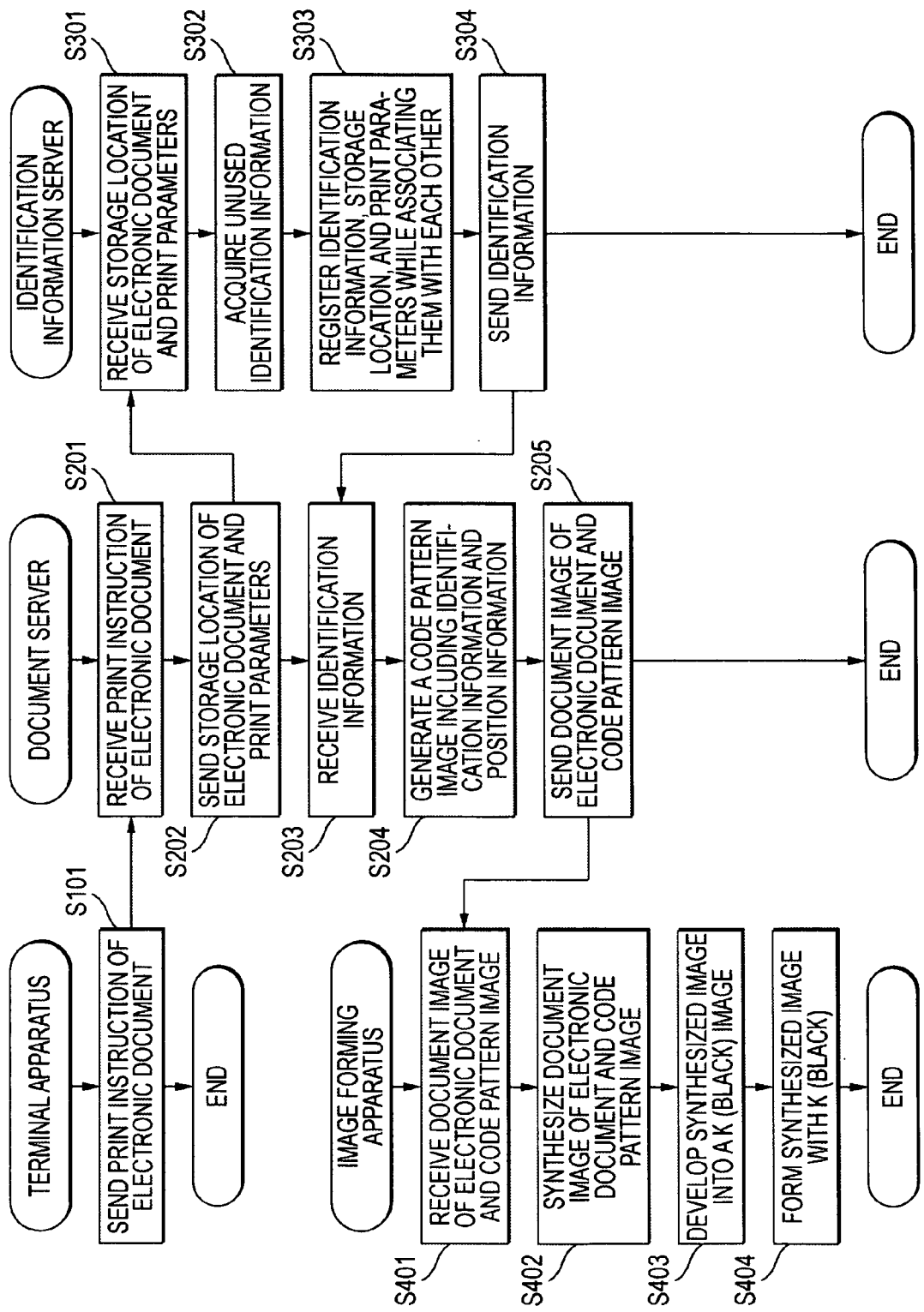
FIG. 2 is a sequence diagram concerning generation of a print document in accordance with the exemplary embodiment.

FIG. 2 is a sequence diagram illustrating the operation at this time.

First, a user operates the terminal apparatus 10 to instruct an electronic document to be printed from among the electronic documents stored in the document server 20. Then, the terminal apparatus 10 transmits an instruction for printing that electronic document to the document server 20 (Step 101). The terminal apparatus 10 also transmits print parameters designated by the user. Here, the print parameters may include pages, a number of copies, a paper size, N-up printing (printing in which N pages of an electronic document are allotted to one page of a paper) and margin.

The document server 20 then receives the instruction for printing the electronic document (Step 201). The document server 20 transmits to the identification information server 30 a storage location of the electronic document, which the instruction requests to print, and the print parameters received from the terminal apparatus 10 (Step 202).

Then, the identification information server 30 receives the storage location of the electronic document and the print parameters (Step 301). The identification information server 30 fetches unused identification information from a database for managing the identification information (Step 302). Here, the number of pieces of identification information to be fetched is determined based on the print parameters. Namely, number of the fetched identification information is equal to a number obtained by multiplying the number of pages to be printed by the number of copies. However, in the case where the print parameter includes an instruction for N-up printing, N-up is also taken into consideration. For example, in the case where 5 copies of an electronic document having 10 pages is printed in 2-up, 25 (=10÷2×5) pieces of identification information are fetched.

Next, the identification information server 30 registers the identification information, the storage location of the electronic document and the print parameters in the database while associating the storage location of the electronic document and the print parameters with each other (Step 303). Then, the identification information server 30 transmits the identification information to the document server 20 (Step 304).

Then, the document server 20 receives the identification information (Step 203). The document server 20 generates a code pattern image in which the identification information and the position information are embedded (Step 204). Generation processing of a code pattern image will be described later in detail.

Subsequently, the document server 20 transmits a document image of the electronic document and the code pattern image to the image forming apparatus 40 and instructs to from an image (Step 205). This instruction may be effected in the following manner. That is, the document server 20 generates a print description language (PDL) from, for example, the electronic document, the identification information and the position information and transmits the generated PDL. The "document image" of the electronic document may be a binary image generated based on an electronic document.

Subsequently, the image forming apparatus 40 receives the document image of the electronic document and the code pattern image (Step 401). The image forming apparatus 40 first synthesizes the document image and the code pattern image (Step 402). The image forming apparatus 40 then develops the synthesized image into a K (black) image (Step 403). Next, the image forming apparatus 40 forms the synthesized image on a medium with a K (black) toner (Step 404).

In this exemplary embodiment, the identification information server 30 merely issues the identification information, and the document server 20 generates the code pattern image including the identification information and instructs the image forming apparatus 40 to form an image. Alternatively, the identification information server 30 may generate the code pattern image and instructs the image forming apparatus 40 to form an image.

Also, the image forming apparatus 40 may generate the code pattern image. In that case, the document server 20 or the identification information server 30 transmits to the image forming apparatus 40 the PDL, which is generated from the electronic document and which has the identification information added thereto, and the image forming apparatus 40 generates the code pattern image including the identification information.

Also, in this exemplary embodiment, a database is provided in the identification information management server 30 and stores the identification information, the storage location of the electronic document and the print parameters while associating them each other. By placing such a database in a sharable apparatus, it becomes possible to cope with plural users and to ensure security of the electronic documents making use of the access control technology of the server. However, it does not mean that such a configuration must be adopted. The database may be provided in the terminal apparatus 10 or the document server 20.

Next, a description will be given on a code pattern, which serves as an origin of the code pattern image generated in this exemplary embodiment.

FIGS. 3A and 3B are diagrams for explaining the code pattern.

First, a description will be given on bit patterns, which make up the code pattern.

FIG. 3A shows one arrangement example of the bit patterns.

The bit pattern is the minimum unit of information embodiment. Here, as shown in FIG. 3A, bits are disposed at two positions selected from nine positions. In FIG. 3A, black squares indicate the positions where the bits are disposed, and hatched squares indicate the positions where no bits are disposed. As for combinations in which two locations are selected from among the nine locations, there are 36 ($=_9C_2$) combinations. Accordingly, the arrangement method can represent information of 36 combinations (about 5.2 bits).

However, it is assumed that the identification information and the position information are expressed by using 32 combinations (5 bits) of these 36 combinations.

Incidentally, the minimum square shown in FIG. 3A has a size of 2 dots×2 dots in 600 dpi. Since the size of one dot in 600 dpi is 0.0423 mm, one side of this minimum square is 84.6 μm (=0.0423 mm×2). As the dots making up a code pattern become larger, the dots are more noticeable. Therefore, the dots should preferably be as small as possible. However, if the dots are too small, the dots cannot be printed by the printer. Therefore, the aforementioned value, which is larger than 50 μm and is smaller than 100 μm, is adopted as the size of the dot. Hence, it is possible to form dots having a size, which is suitable and printable by the printer. That is, 84.6 µm×84.6 µm is the minimum size which can be stably formed by the printer.

It should be noted that since the dots are set to have such a size, one side of one bit pattern becomes about 0.5 mm (=0.0423 mm×2×6).

In addition, a description will be given on the code pattern, which is formed of such bit patterns.

FIG. 3B shows one arrangement example of the code pattern.

Here, the minimum square shown in FIG. 3B corresponds to the bit pattern shown in FIG. 3A. That is, identification codes obtained by encoding the identification information are embedded by using 16 (=4×4) bit patterns. Also, X position codes obtained by encoding the position information in the X direction and Y position codes obtained by encoding the position information in the Y direction are respectively embedded by using four bit patterns. Further, a synchronization code for detecting a position and rotation of the code pattern is embedded in an upper left corner portion of the code pattern by using one bit pattern.

Since the size of one code pattern is equal to the width of five bit patterns, the size of one code pattern becomes about 2.5 mm. In this exemplary embodiment, a code pattern image, which is formed based on the thus generated code patterns, is printed on the entire surface of the paper.

Next, a description will be given on processing for encoding the identification information and the position information, and generating a code pattern image from the encoded information. In the case where the operation shown in FIG. 2 is performed, the document server 20 performs this processing.

Figure 4:
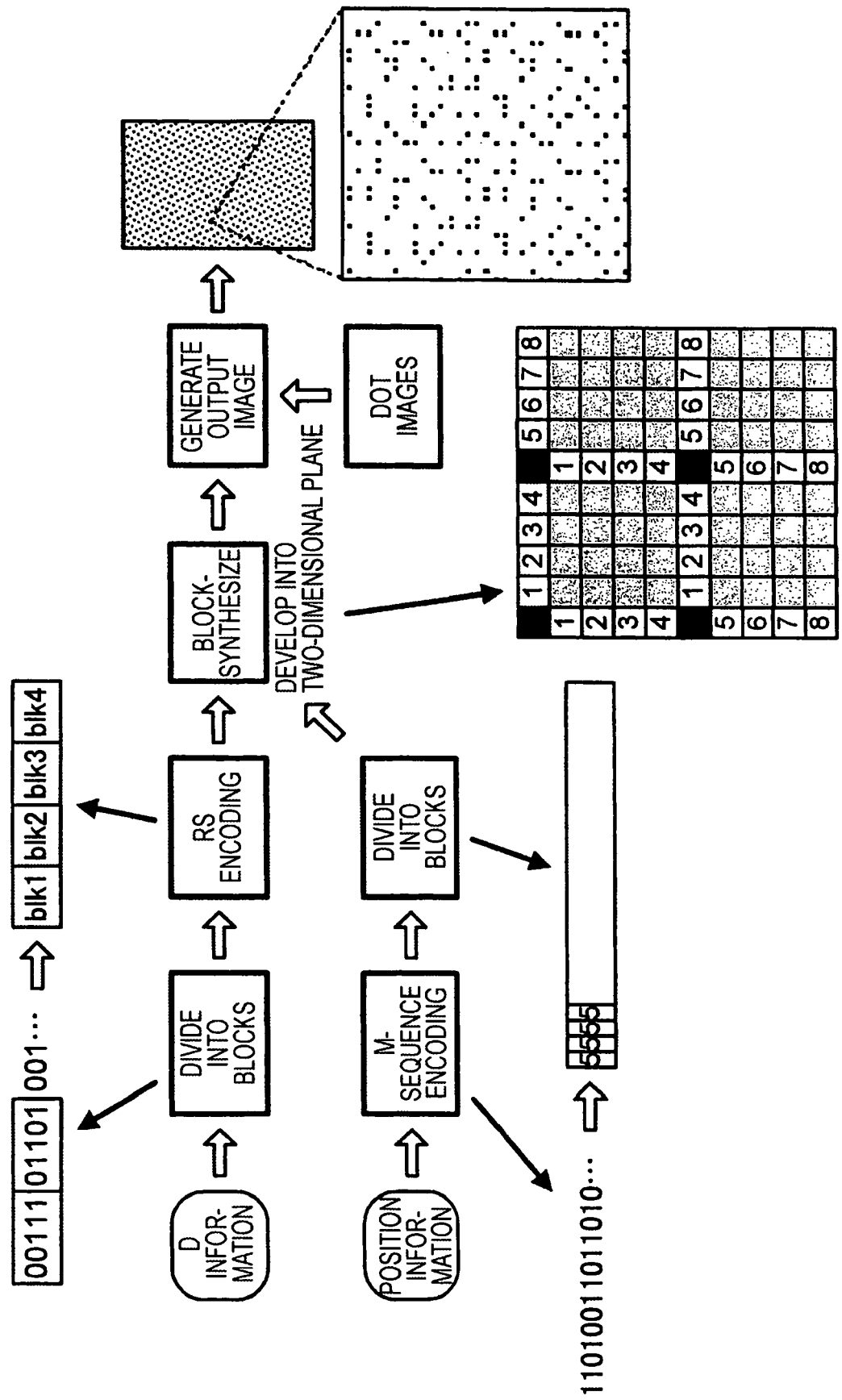
FIG. 4 is a diagram for explaining encoding of information and generation of a code pattern image in accordance with the exemplary embodiment.

FIG. 4 is a diagram for explaining the processing of such encoding and image formation.

First, a description will be given on the encoding of the identification information.

Reed-Solomon (RS) codes of a block encoding system are used in the encoding of the identification information. As described with reference to FIGS. 3A and 3B, in this exemplary embodiment, information is embedded by using bit patterns which are capable of expressing 5-bit information. Accordingly, since errors of information also occur in 5-bit units, RS codes having excellent encoding efficiency in the block encoding system are used. However, the encoding system is not limited to the RS codes. Other encoding systems, such as BCH code, may be used.

As described above, in this exemplary embodiment, information is embedded by using bit patterns having an information quantity of 5 bits. Accordingly, it is necessary to set the block length of the RS codes to 5 bits. For this reason, the identification information is divided into blocks each having 5 bits. In FIG. 4, the first block "00111" and the second block "01101" are extracted from the identification information "0011101101001 . . . ."

RS encoding processing is performed on the blocks formed from the identification information. In FIG. 4, after the identification information is formed into blocks such as "blk1," "blk2," "blk3," "blk4," . . . , RS encoding is performed on the blocks "blk1," "blk2," "blk3," "blk4," . . . .

In this exemplary embodiment, the identification information is divided into 16 (=4×4) blocks. Accordingly, the number of code blocks in the RS codes can be set to 16. Also, the number of information blocks can be designed in accordance with the state of occurrence of errors. For example, if the number of information is set to 8, RS (16, 8) codes are obtained. As for these codes, even if errors occur in 4 blocks (=(16−8)÷2) of the encoded information, it is possible to correct them. In addition, if the position of the error can be specified, it is possible to further improve the correction capability. It should be noted that, in this case, the quantity of information stored in the information blocks is 40 bits (=5 bits×8 blocks). Accordingly, it is possible to express about one trillion kinds of identification information.

Next, a description will be given on the encoding of position information.

In the encoding of the position information, M-sequence codes which are a kind of a pseudorandom number sequence. Here, the M-sequence is a maximum-cycle sequence which can be generated by a K-stage linear shift register, and has a sequence length of ($2^K-1$). Arbitrary sequential K bits fetched from this M-sequence have a characteristic that they do not appear at other positions in the same M-sequence. Accordingly, the position information can be encoded by making use of this characteristic.

In this exemplary embodiment, an M-sequence is generated by determining a necessary degree of the M-sequence from the length of the position information to be encoded. However, it is unnecessary to generate M-sequences each time in a case where the length of the position information to be encoded is known in advance. Namely, it suffices if a fixed M-sequence is generated in advance, and it is stored in a memory or the like.

For example, it is assumed that an M-sequence (K=13) with a sequence length of 8191 is used.

In this case, since the position information is also embedded in 5-bit units, 5 bits are respectively fetched from the M-sequence with the sequence length of 8191, and are formed into blocks. In FIG. 4, 5 bits are respectively formed into blocks from the M-sequence "11010011011010 . . . ."

After the identification information is divided into blocks as described above, the identification information is encoded by the RS codes. In addition, after the position information is encoded by the M-sequence, and is formed into blocks. Then, blocks are synthesized, as illustrated in the drawing. Namely, these blocks are developed into a two-dimensional plane in a format such as the one illustrated in the drawing. The format shown in FIG. 4 corresponds to the format shown in FIG. 3B. Namely, the black squares mean the synchronization codes. In addition, "1," "2," "3" and "4" arranged in the horizontal direction mean X-position codes, while "1," "2," "3" and "4" arranged in the vertical direction mean Y-position codes. As for the position codes, if the position in the medium differs, different information is arranged; therefore, the position codes are indicated by numbers which correspond to coordinate positions. On the other hand, gray squares mean identification codes. As for the identification codes, even if a position in the medium differs, the same information is arranged; therefore, all the identification codes are indicated by the same marks.

As also can be understood from the drawing, there are 4 bit patterns between two synchronization codes. Accordingly, it is possible to arrange a partial sequence of 20 (=5×4) bits in the M-sequence. If a partial sequence of 13 bits is fetched from the partial sequence of 20 bits, it is possible to specify to which portion in the entirety (8191) the partial sequence constituted by the 13 bits belongs. In the case where the 13 bits of the 20 bits are used in the specification of the position, the detection or correction of an error of the fetched 13 bits can be effected by using the remaining 7 bits. Namely, error detection and correction become possible by confirming the consistency of the 20 bits by using the same generation polynomial used at the time of generating the M-sequence.

Subsequently, the bit patterns in each block are formed into an image by referring to the dot image. Then, an output image representing the information with the dots such as those shown on the rightmost side in FIG. 4 is generated.

FIG. 5 is diagrams schematically illustrating the generation of the synthesized image.

First, FIG. 5(A) shows an enlarged view of a portion of the document image of an electronic document. FIG. 5(B) shows an enlarged view of a portion of a code pattern image, which is synthesized into this document image.

In this exemplary embodiment, when the image of FIG. 5(A) and the image of FIG. 5(B) are synthesized, the image of FIG. 5(C) is generated by performing an exclusive OR operation between the images shown in FIGS. 5(A) and 5(B). Namely, in the background portion of the document image, the code pattern image is formed with the K (black) toner, while in the image portion of the document image, portions except the code pattern image are formed with the K (black) toner.

The image forming apparatus 40 shown in FIG. 2 performs such synthesis processing between the document image and the code pattern image. However, the document server 20 and the identification information server 30 may perform this synthesis processing. Accordingly, a description will be given below by assuming that a general image generating apparatus performs this synthesis processing.

Figure 6:
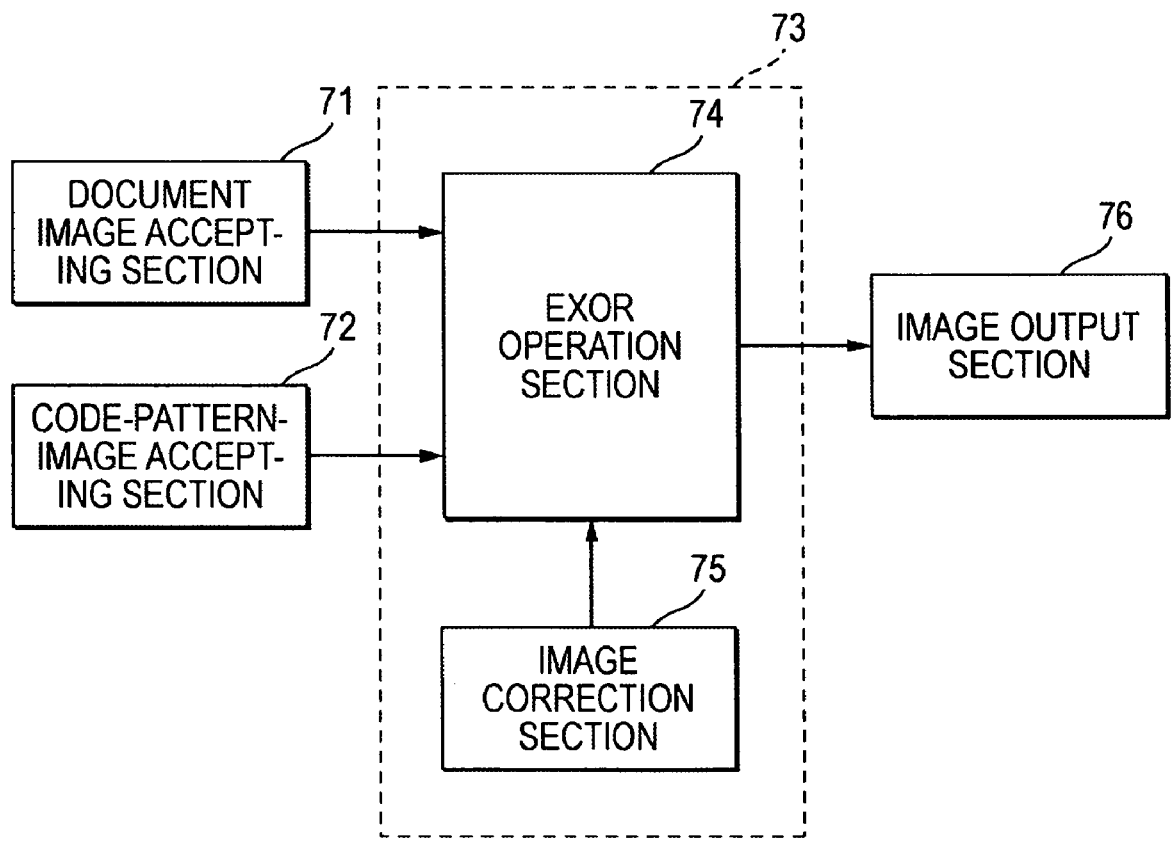
FIG. 6 is a block diagram illustrating the functional configuration of an image generating apparatus according to the exemplary embodiment.

FIG. 6 is a block diagram illustrating the functional configuration of the image generating apparatus according to this exemplary embodiment.

As illustrated in the drawing, this image generating apparatus includes a document image accepting section 71, a code-pattern-image accepting section 72; an image synthesizing section 73; and an image output section 76. Also, the image synthesizing section 73 includes an EXOR operation section 74 and an image correction section 75.

The document image accepting section 71 accepts a document image input from the outside. The code-pattern-image accepting section 72 accepts a code pattern image input from the outside.

The image synthesizing section 73 synthesizes the document image accepted by the document image accepting section 71 and the code pattern image accepted by the code-pattern-image accepting section 72. In this image synthesizing section 73, the EXOR operation section 74 performs an exclusive OR operation between the document image and the code pattern image. Further, the image correction section 75 corrects the size of image elements in the image resulting from the exclusive OR operation.

The image output section 76 outputs the image, which is generated by the EXOR operation section 74 and then corrected by the image correction section 75. If this image generating apparatus is a part of the image forming apparatus 40, the image output by the image output section 76 is printed on a medium by an unillustrated image forming mechanism of the image forming apparatus 40. Also, if this image generating apparatus is implemented by the document server 20 and the identification information server 30, the image output by the image output section 76 is transmitted to, for example, the image forming apparatus 40 via the network 90.

These functional portions are implemented as software and hardware resources cooperate. Specifically, the CPU of the image generating apparatus reads a program for realizing the respective functions of the document image accepting section 71, the code-pattern-image accepting section 72, the EXOR operation section 74, the image correction section 75, and the image output section 76 from, for example, a magnetic hard disk drive into a main memory and executes the program. Also, this program may not only be stored in advance in the magnetic hard disk drive, but be provided by being loaded from a recording medium such as a CD-ROM or downloaded from a network such as the Internet.

Next, a description will be given on the operation of this image generating apparatus.

Figure 7:
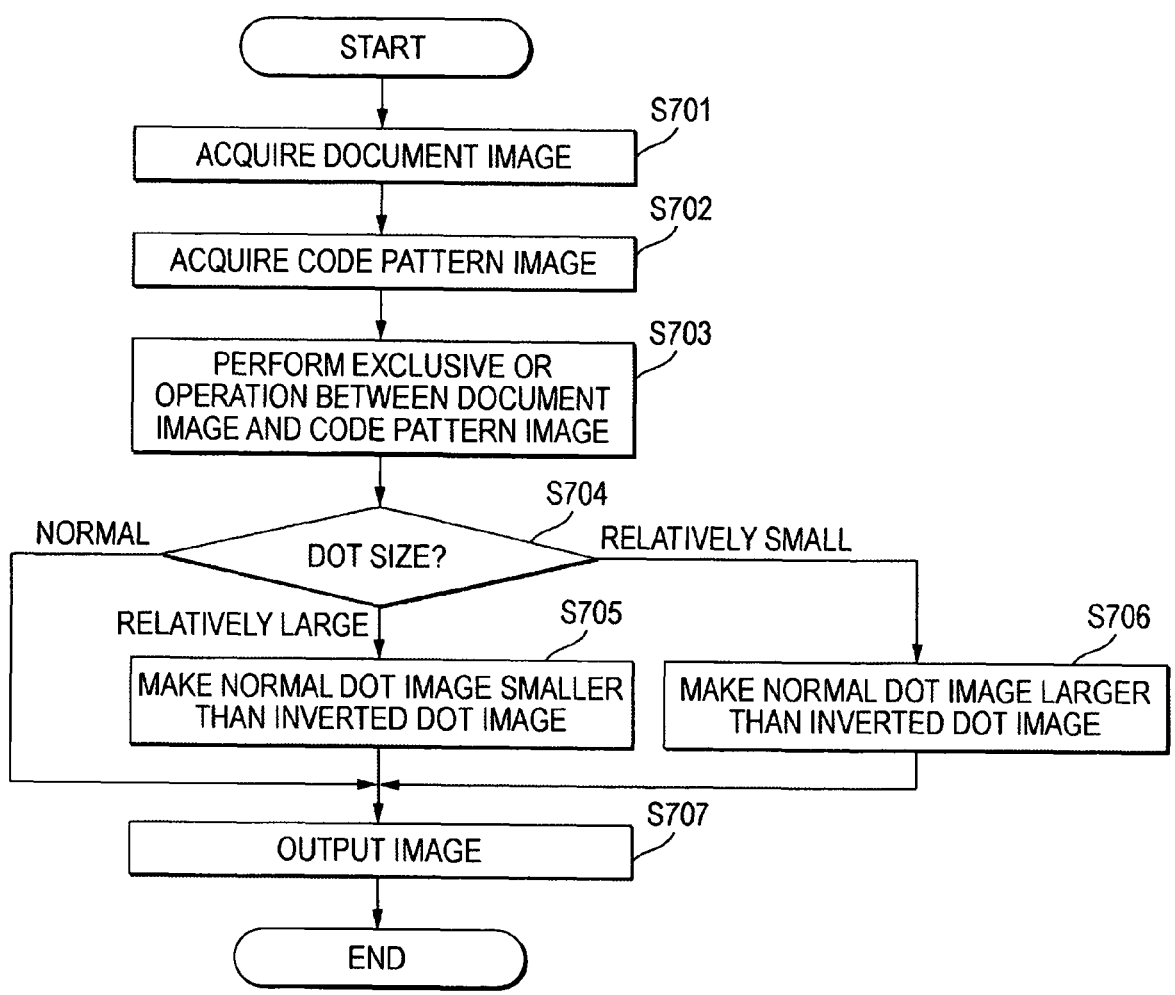
FIG. 7 is a flowchart illustrating the operation of the image generating apparatus according to the exemplary embodiment.

FIG. 7 is a flowchart illustrating the operation of the image generating apparatus.

As shown in the flowchart, the document image accepting section 71 of the image generating apparatus first acquires a document image (Step 701). Also, the code-pattern-image accepting section 72 acquires a code pattern image (Step 702).

Then, the EXOR operation section 74 performs an EXOR (exclusive OR) operation between the acquired two images (Step 703).

In this exemplary embodiment, as described with reference to FIGS. 3A and 3B, the size of an image element (a minimum unit in which the toner is placed) making up a code pattern image is 2 dots×2 dots in 600 dpi, i.e., has about 85 µm in diameter. In the case of forming such a small image element, the image element may be formed with a relatively large size or a relatively small size due to the characteristic of the image forming mechanism. This is because there is an image forming mechanism, which forms dots with a relatively large size and is another image forming apparatus, which forms the dots with a relatively small size. That is, if an image forming mechanism, which forms the dots with a relatively large size, forms an image element in the background portion of the document image and an image element in the image portion of the document image so that both the image elements are formed of the same number of dots, normal image element (portions in which the toner is placed) in the background portion is formed with a relatively large size, while inverted image element (portions in which no toner is placed) in the image portion are formed with a relatively small size. On the other hand, if an image forming mechanism, which forms the dots with a relatively small size, is used, this tendency is reversed.

However, the normal image elements and the inverted image elements may have the same size over the entire image area. Accordingly, when generating an image, this exemplary embodiment adjusts sizes of the image elements so that the sizes of the image element have the same size when the image is formed on the paper. Here, in the following description, it is assumed that the image elements making up the code pattern image are regarded as an "dot image" as in FIG. 4.

First, the image correction section 75 determines the characteristic of the image forming mechanism, which is used when a generated image is formed on the medium (Step 704). Namely, the image correction section 75 determines as to whether the characteristic of the image forming mechanism is one that forms dots with a relatively large size, one that forms dots with a relatively small size, or one that forms dots with a normal size.

The image correction section 75 may make determination as below. For example, a user measures sizes of dots, which are printed by the image forming apparatus 40. Then, the user inputs into the image forming apparatus 40 information, which is used to correct the dot size (e.g. the measured sizes of the printed dots). The image correction section 75 determines the characteristic of the image forming mechanism based on the input information. More specifically, it is assumed that dots each having a size of 2 dots×2 dots in 600 dpi are printed with the image forming apparatus 40 and that the user measures the thus printed dots. In this case, the image correction section 75 compares the measurement result with the theoretical value (84.6 µm×84.6 µm) to determine the characteristic of the image forming mechanism.

Here, when determining that the image forming mechanism forms the dots with a normal size, the image correction section 75 does not correct the image, and then outputs the image generated by the EXOR operation section 74 as it is to the image output section 76.

Also, when determining that the image forming mechanism forms the dots with a relatively large size, the image correction section 75 makes the normal dot image (the portion in which the toner is placed) generated in the background portion of the document image to be smaller than the inverted dot image (the portion in which no toner is placed) generated in the image portion of the document image (Step 705). For example, when determining that the measurement result is larger than the theoretical value, the image correction section 75 removes a dot from the "normal dot image" having 2 dots×2 dots dot by dot. The image correction section 75 may adjust the size of the "inverted dot image" in a similar manner. As a result, the EXOR operation section 74 outputs the corrected image to the image output section 76.

Furthermore, when determining the image forming mechanism forms the dots with a relatively small size, the image correction section 75 makes the normal dot image (the portion in which the toner is placed) generated in the background portion of the document image to be larger than the inverted dot image (the portion in which no toner is placed) generated in the image portion of the document image (Step 706). For example, when determining that the measurement result is smaller than the theoretical value, the image correction section 75 adds a dot to the surroundings of the "normal dot image" having 2 dots×2 dots dot by dot. The image correction section 75 may adjust the size of the "inverted dot image" in a similar manner. As a result, the EXOR operation section 74 outputs the corrected image to the image output section 76.

Subsequently, the image output section 76 outputs the image received from the image correction section 75, to the image forming mechanism (not shown), or outputs it to the image forming apparatus 40 via the network 90 (Step 707).

In the exemplary embodiment, the sizes of the normal dot image and the inverted dot image are adjusted after the EXOR operation between the document image and the code pattern image is performed. However, the order of processing is not limited thereto. That is, in the code pattern image on which the EXOR operation has not been performed, a dot image to be superposed on the document image and a dot image not to be superpose on the document image may be distinguished and then, the sizes of the two types of dot images may be adjusted.

Next, a description will be given on reading of information from a medium on which the synthesized image has thus been printed.

First, a description will be given on general functions of an electronic pen 60, which is used in the reading of information.

Figure 8:
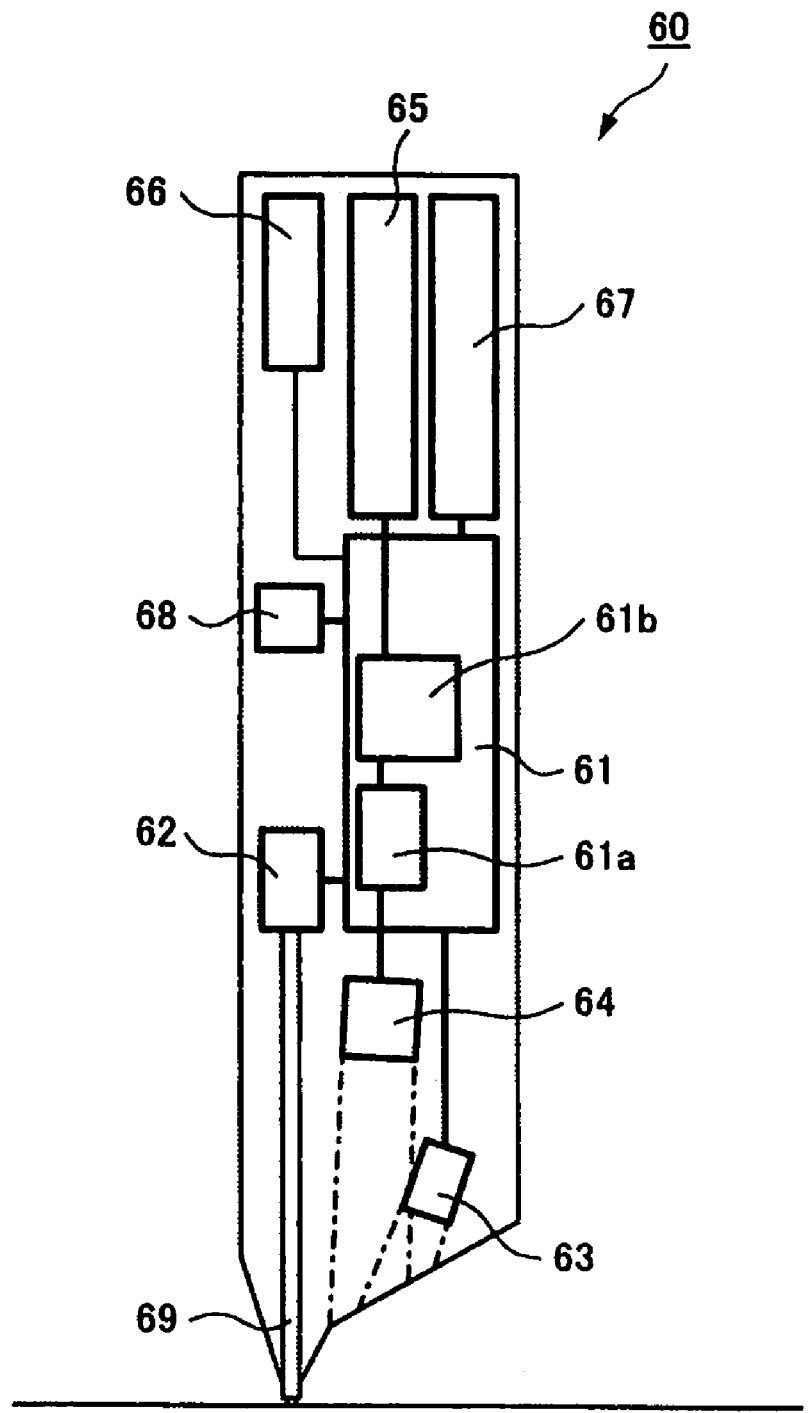
FIG. 8 is a diagram illustrating the mechanism of an electronic pen according to the exemplary embodiment.

FIG. 8 is a diagram illustrating the mechanism of the electronic pen 60.

As shown in FIG. 8, the electronic pen 60 includes a control circuit 61 for controlling the operation of the pen 60 as a whole. Further, the control circuit 61 includes an image processing section 61a for processing a code pattern image detected from an input image, and a data processing section 61b for extracting identification information and position information from the processing result of the image processing section 61a.

A pressure sensor 62 is connected to the control circuit 61. The pressure sensor 62 detects a writing action, which is performed with the electronic pen 60, based on pressure applied to a pen tip 69. An infrared LED 63 and a infrared CMOS 64 are also connected to the control circuit 61. The infrared LED 63 applies infrared rays to the medium. The infrared CMOS 64 inputs an image. Also, an information memory 65, a communication circuit 66, a battery 67 and a pen ID memory 68 are connected to the control circuit 61. The information memory 65 is used to store the identification information and the position information. The communication circuit 66 communicates with an external device. The battery 67 is used to drive the pen 60. The pen ID memory 68 stores identification information of the pen 60 (pen ID).

Here, a description will be given on an outline of the operation of this electronic pen 60.

When writing is done with the electronic pen 60, the pressure sensor 62 connected to the pen tip 69 detects the writing action. Then, the infrared LED 63 is turned on, and the infrared CMOS 64 captures an image on the medium by a CMOS sensor.

To suppress the power consumption, the infrared LED 63 may be pulse-blinked in synchronism with a shutter timing of the CMOS sensor.

The infrared CMOS 64 uses a CMOS sensor of a global shutter system, which is capable of transferring the captured image simultaneously. Further, the CMOS sensor has sensitivity in the infrared region. Also, a visible light cutoff filter is disposed over the entire surface of the CMOS sensor so as to reduce the effect of disturbance. The CMOS sensor captures images at a frame rate of about 70 fps to 100 fps (frames per second). It is noted that the imaging device is not limited to the CMOS sensor. Other imaging devices such as a CCD may be used.

If the image thus captured is input to the control circuit 61, the control circuit 61 acquires the code pattern image from the captured image. Then, the control circuit 61 decodes the acquired code pattern image to acquire the identification information and the position information, which are embedded in the code pattern image.

Hereafter, a description will be given on the operation of the control circuit 61.

Figure 9:
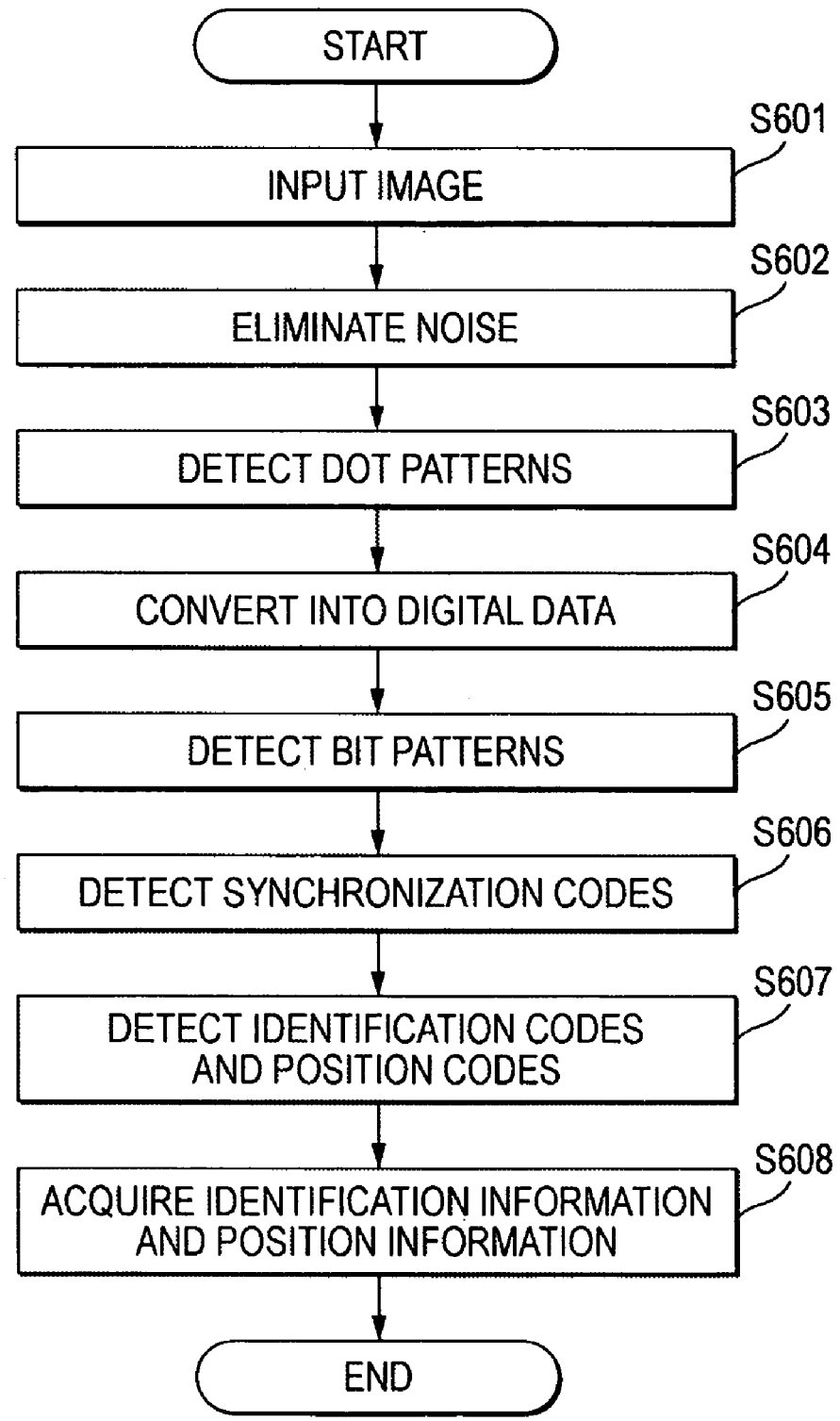
FIG. 9 is a flowchart illustrating the operation of the electronic pen according to the exemplary embodiment.

FIG. 9 is a flowchart illustrating the operation of the control circuit 61.

First, an image is input to the image processing section 61a (Step 601). The image processing section 61a performs processing for eliminating noise included in the input image (Step 602). Here, the noise includes noise, which is generated by the variation of the CMOS sensitivity or by the electronic circuit. What processing should be effected to eliminate noise should be determined in accordance with the characteristic of the imaging system of the electronic pen 60. For example, blur processing and edge enhancement processing such as unsharp masking may be performed.

Next, the image processing section 61a detects dot patterns (the positions of dot images) from the input image (Step 603). For example, binarization processing may be performed to separate the input image into dot pattern portions and background portions, and it is possible to detect dot patterns from positions of individual binary images. In the case where noise components are included in the binary image in large quantities, it is necessary to combine filter processing for determining dot patterns by using an area and shape of the binary image.

Also, the image processing section 61a converts the detected dot patterns into digital data in a two-dimensional array (Step 604). For example, in the two-dimensional array, a position where a dot is present is converted into a "1," while a position where a dot is absent is converted into a "0." This digital data in the two-dimensional array is then output from the image processing section 61a to the data processing section 61b.

Next, the data processing section 61b detects a bit pattern including a combination of two dots shown in FIG. 3A (Step 605). For example, the data processing section 61b moves a boundary position of a block corresponding to the bit pattern in the two-dimensional array, to detect such a boundary position that the number of dots included in the block becomes two. Thereby, the data processing section 61b detects a bit pattern.

When detecting the bit patterns in the above manner, the data processing section 61b detects synchronization codes by referring to the types of bit patterns (Step 606). The data processing section 61b then detects the identification codes and the position codes on the basis of the positional relationship with the synchronization codes (Step 607).

Subsequently, the data processing section 61b acquires the identification information by decoding the identification codes, and acquires the position information by decoding the position codes (Step 608). As for the identification codes, the data processing section 61b performs RS decoding processing on the information code to obtain the identification information. Meanwhile, as for the position codes, the data processing section 61b compares read partial sequences with the M sequence used at the time of generating the image to obtain the position information.

In this exemplary embodiment, the pen 60 restores a document image and a code pattern image from the synthesized image.

FIG. 10 is diagrams schematically illustrating the restoration of the document image and the code pattern image.

First, FIG. 10(A) is an enlarged view showing a portion of the synthesized image. This image is the same as that shown in FIG. 5(C).

In this exemplary embodiment, the document image of FIG. 10(B) and the code pattern image of FIG. 10(C) are restored by expanding and/or shrinking the image of FIG. 10(A). That is, FIG. 10(B) is an enlarged view showing a portion of the document image of an electronic document, which is the same image as that shown in FIG. 5(A). Also, FIG. 10(C) is an enlarged view showing a portion of the code pattern image, which is the same image as that shown in FIG. 5(B).

For example, black code patterns and white code patterns are removed from the image shown in FIG. 10(A) to generate the image shown in FIG. 10(B). The black code patterns and the white code patterns have 2 dots×2 dots (equal to or smaller than a predetermined size). Also, each black code pattern is surrounded by white dots, and each white code pattern is surrounded by black dots. Then, the exclusive OR operation between the images shown in FIGS. 10(A) and 10(B) are performed to generate the image shown in FIG. 10(C).

Here, a description has been given with the assumption that the electronic pen 60 performs such restoration processing of a document image and a code pattern image. However, a PC, which receives information from the electronic pen 60, may perform this restoration processing. Also, a scanner, which can scan the entire surface of a medium on which a document image and a code pattern image are printed may perform this restoration processing. Then, a description will be given below with the assumption that a general image processing apparatus performs this restoration processing.

FIG. 11 is a block diagram illustrating the functional configuration of the image processing apparatus according to this exemplary embodiment.

Figure 11A:
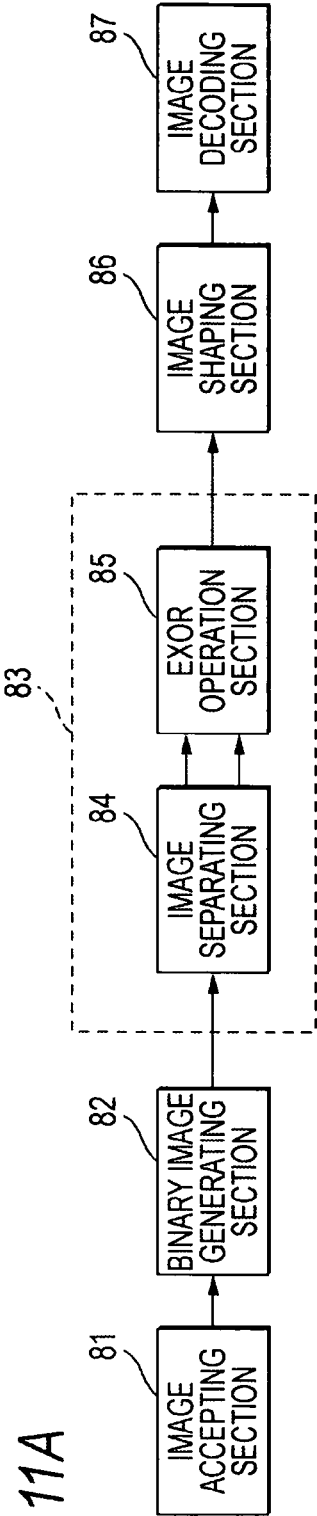
FIG. 11 is a block diagram illustrating the functional configuration of an image processing apparatus according to the exemplary embodiment.

As shown in FIG. 11A, this image processing apparatus includes an image accepting section 81; a binary image generating section 82; a code-pattern-image generating section 83; an image shaping section 86; and an image decoding section 87. The code-pattern-image generating section 83 includes an image separating section 84 and an EXOR operation section 85.

The image accepting section 81 accepts an image to be processed. The binary image generating section 82 converts the accepted image into a binary image.

The code-pattern-image generating section 83 generates a code pattern image on the basis of this binary image. The image separating section 84 generates two types of images, which are used to separate the binary image into a code pattern image and a document image. The EXOR operation section 85 performs an EXOR (exclusive OR) operation between these two types of generated images to generate a code pattern image.

The image shaping section 86 eliminates noise components included in the generated code pattern image. The image decoding section 87 decodes the code information image with the noise components eliminated therefrom, to obtain information.

Also, the configuration of the image separating section 84 differs depending on the two types of images generated. Here, two examples of the configuration of the image separating section 84 will be shown.

Figure 11C:
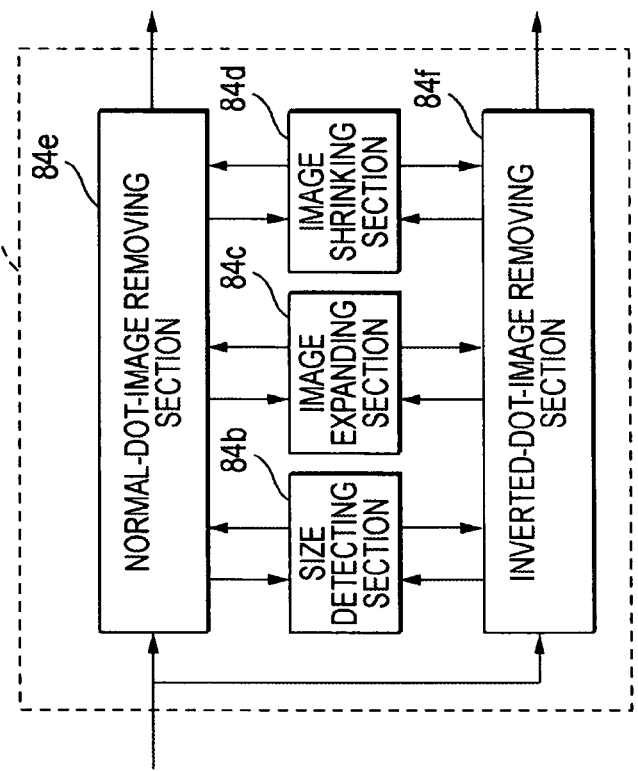
Figure 11B:
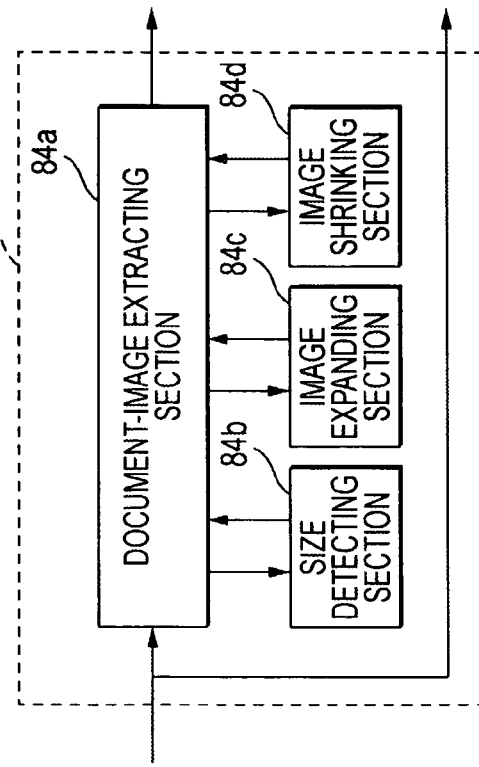

First, FIG. 11B shows a first example of the configuration of the image separating section 84.

As shown in FIG. 11B, in the first example, the image separating section 84 includes a document-image extracting section 84a, a size detecting section 84b, an image expanding section 84c and an image shrinking section 84d.

The document-image extracting section 84a extracts a document image from the binary image by controlling the respective functional portions, which will be described later. The size detecting section 84b detects a size, which is used when the binary image is expanded and when the binary image is shrinked. The image expanding section 84c performs expanding processing on a designated image. Meanwhile, the image shrinking section 84d performs shrinking processing on a designated image. The expanding processing and the shrinking processing are described in "DIGITAL PICTURE PROCESSING Second Edition Volume 2 (Azriel Rosenfeld and Avinash C. Kak, Computer Science and Applied Mathematics, page 215, c. Shrinking and expanding)," contents of which are incorporated herein by reference in its entirety.

Here, the expanding processing is processing for expanding an image, and shrinking processing (shrink processing) is processing for shrinking an image. Specifically, the expanding processing is realized by changing pixels of the background portion, which are located in a fixed range from a boundary between the image portion and the background portion, to pixels of the image portion. Meanwhile, the shrinking processing is realized by changing pixels of the image portion, which are located in the fixed range from the boundary between the image portion and the background portion, to pixels of the background portion.

Figure 14C:
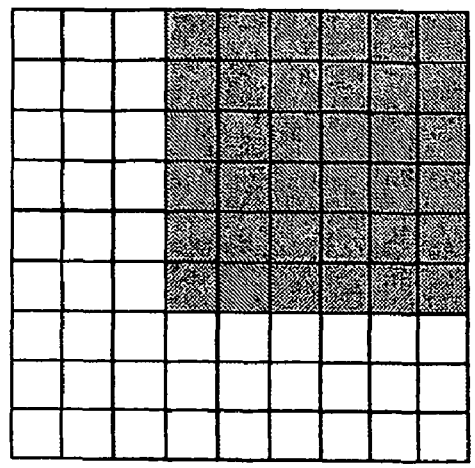
FIG. 14 is a view for explaining expanding processing and shrinking processing according to the exemplary embodiment.
Figure 14B:
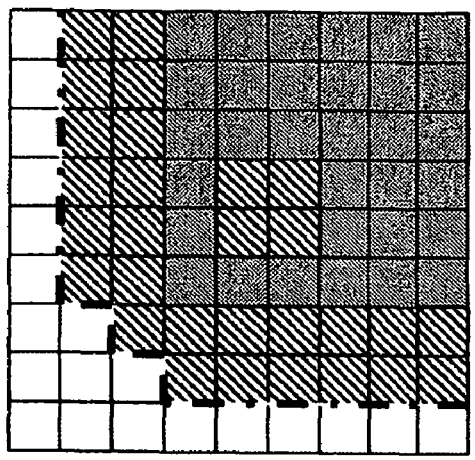
Figure 14A:
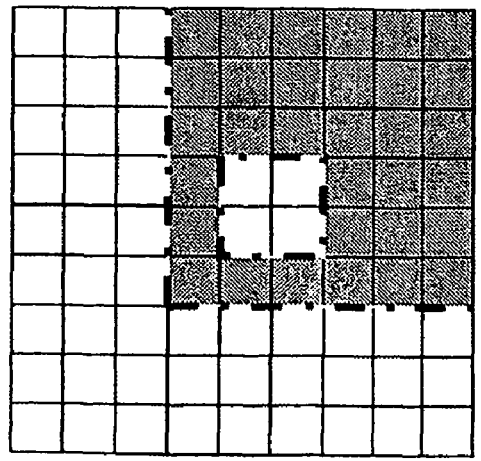

With reference to FIG. 14, the expanding processing and the shrinking processing will be described more specifically. In FIG. 14(A), thick dotted lines represent boundaries between the image portion and the background portion. If the expanding processing is performed on the image shown in FIG. 14(A), white dots (background portion) within 2 dots from the boundaries are replaced with black dots. As a result, an image shown in FIG. 14(B) is obtained. In FIG. 14(B), hatched dots represent black dots to which the white dots within 2 dots from the boundaries are changed by the expanding processing. Then, if the shrinking processing is performed on the image shown in FIG. 14(B), black dots (image portion) within 2 dots from the boundaries are replaced with white dots. As a result, an image shown in FIG. 14(C) is obtained. It is noted that since hatched dots, which are surrounded by the other black dots and are in the center portion of FIG. 14(B), are far from the boundaries beyond 2 dots, the shrinking processing does not replace such hatched dots with white dots.

Figure 15C:
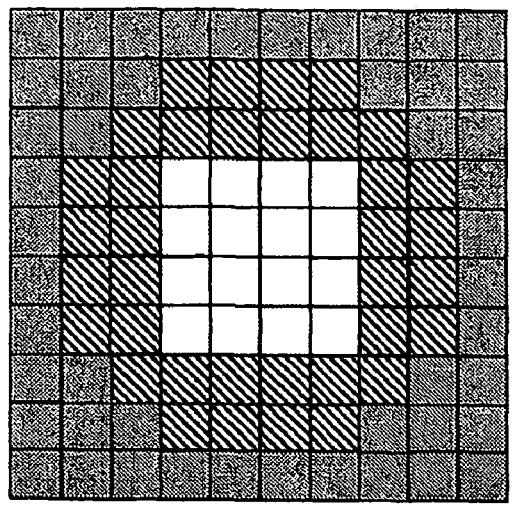
FIG. 15 is a view for explaining expanding processing and shrinking processing according to the exemplary embodiment.
Figure 15B:
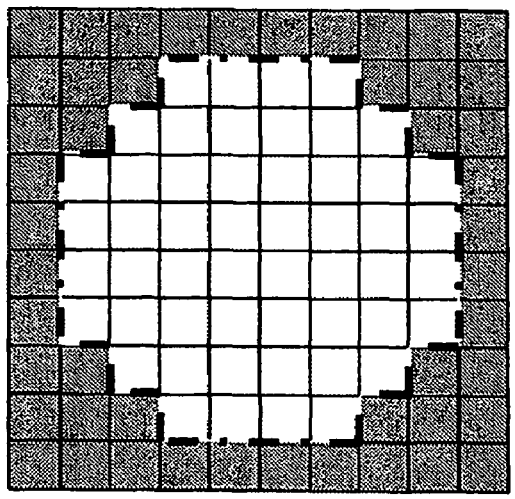
Figure 15A:
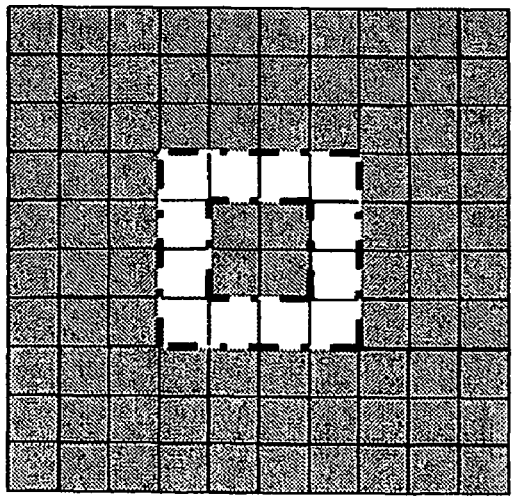

Next, the case where the shrinking processing is performed prior to the expanding processing will be described with reference FIG. 15. Like FIG. 14, in FIG. 15(A), thick dotted lines represent boundaries between the image portion and the background portion. If the shrinking processing is performed on the image shown in FIG. 15(A), black dots (image portion) within 2 dots from the boundaries are replaced with white dots. As a result, an image shown in FIG. 15(B) is obtained. Then, if the expanding processing is performed on the image shown in FIG. 15(B), white dots (background portion) within 2 dots from the boundaries are replaced with black dots. As a result, an image shown in FIG. 15(C) is obtained. In FIG. 14(C), hatched dots represent black dots to which the white dots within 2 dots from the boundaries are changed by the expanding processing. It is noted that although the image shown in FIG. 15(A) has two black dots by two black dots (the normal portion of the code pattern image) in its center, the shrinking processing removes such black dots (see FIG. 15(B)). Therefore, the expanding processing does not add two black dots by two black dots to the center of the image shown in FIG. 15(B). As a result, the image shown in FIG. 15(C) does not have the two black dots by the two black dots in its center.

Next, FIG. 11C shows a second example of the image separating section 84.

As shown in FIG. 11C, in the second example, the image separating section 84 includes a normal-dot-image removing section 84*e*, the size detecting section 84*b*, the image expanding section 84*c*, the image shrinking section 84*d*, and an inverted-dot-image removing section 84*f*.

The normal-dot-image removing section 84*e* removes dot patterns included in the background portion of the document image. Meanwhile, the inverted-dot-image removing section 84*f* removes dot patterns included in the image portion of the document image. Since the size detecting section 84*b*, the image expanding section 84*c*, and the image shrinking section 84*d* are similar to those shown in FIG. 11B, a description thereon will be omitted.

It should be noted that these functional portions are realized as software and hardware resources cooperate. Specifically, the CPU of the image processing apparatus reads a program for realizing the respective functions of the image accepting section 81, the binary image generating section 82, the image separating section 84 (including its internal functions), the EXOR operation section 85, the image shaping section 86; and the image decoding section 87 from, for example, a magnetic hard disk drive into the main memory and executes the program. In addition, this program may not only be stored in advance in the magnetic hard disk drive, but be provided by being loaded from a recording medium such as a CD-ROM or downloaded from a network such as the Internet.

Next, a description will be given on the operation of this image processing apparatus shown in FIG. 11. However, the flow of the general operation of this image processing apparatus is shown in FIG. 9. Namely, Step 601 corresponds to the processing performed by the image accepting section 81; Step 602 corresponds to the processing performed by the image shaping section 86; and Steps 603 to 608 correspond to the processing performed by the image decoding section 87.

Accordingly, here, a description will be given on the processing performed by the binary image generating section 82 and on the processing performed by the code pattern image generating unit 83.

In the image processing apparatus, when the image accepting section 81 outputs a received image to the binary image generating section 82, the binary image generating section 82 converts the received image into a binary image. Here, the binary image generating section 82 performs binarization with using a fixed threshold value or binarization with using a dynamic threshold value generating method, so as to convert the received image into the binary image. Then, the binary image generating section 82 outputs the binary image thus converted, to the image separating section 84. The image separating section 84 then separates this binary image.

Subsequently, in the case where the image separating section 84 has the configuration shown in FIG. 11B, the document-image extracting section 84*a* separates this binary image. On the other hand, if the image separating section 84 has the configuration shown in FIG. 11C, the normal-dot-image removing section 84*e* and the inverted-dot-image removing section 84*f* separate this binary image.

Accordingly, a description will be given below of the operation of these functional portions.

First, a description will be given on the operation of the document-image extracting section 84*a* of the image separating section 84 shown in FIG. 11B.

Figure 12C:
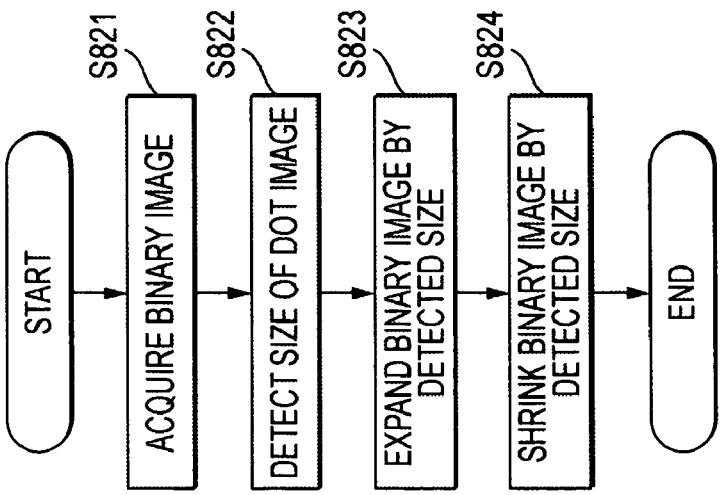
FIGS. 12A to 12C are flowcharts illustrating the operation of the image processing apparatus (image separating section) according to the exemplary embodiment.
Figure 12B:
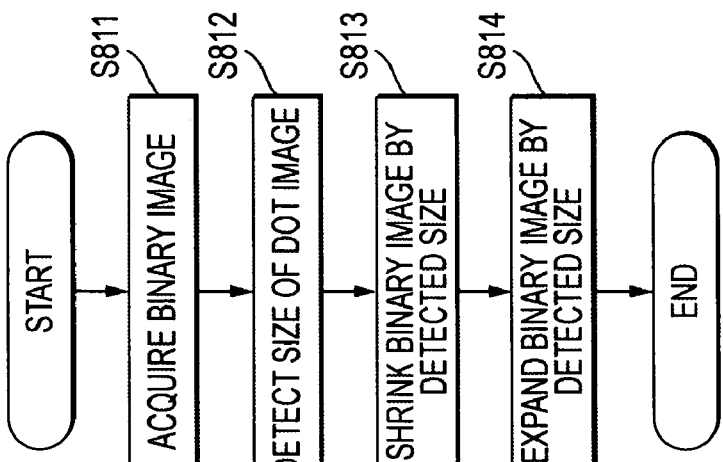
Figure 12A:
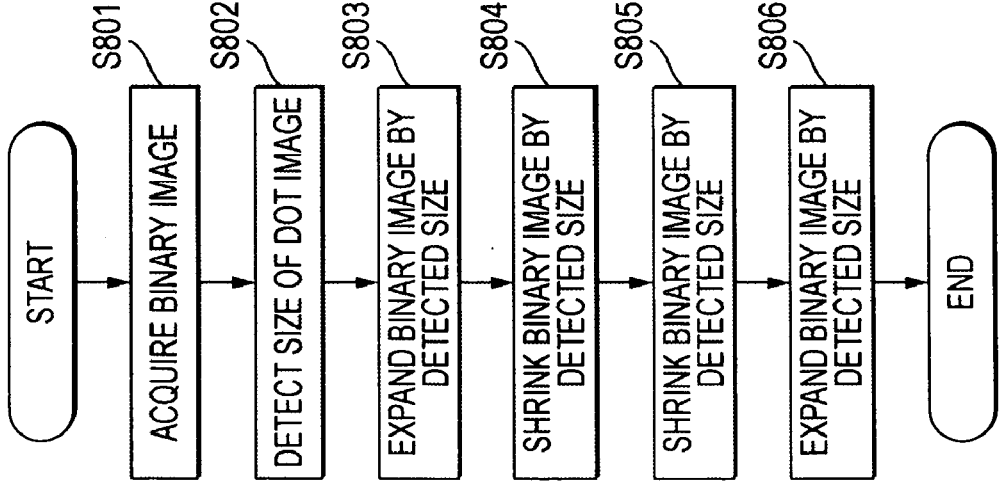

FIG. 12A is a flowchart illustrating the operation of the document-image extracting section 84*a*.

First, the document-image extracting section 84*a* acquires the binary image from the binary image generating section 82 (Step 801). Then, the document-image extracting section 84*a* causes the size detecting section 84*b* to detect a size of the dot image, and acquires the detection result (Step 802). Here, the size detecting section 84*b* is capable of detecting the size of the dot image by the following method, for example. That is, the size detecting section 84*b* performs labeling processing on the binary image, and generates a histogram of an area of the labeled image. Since the dot image should have the largest number of frequencies in the histogram, the area whose frequency is highest is set as an area of the dot image. If the area can be known, radius of the dot image can be calculated. Then, an expanding amount and a shrinking amount can be calculated.

Then, the document-image extracting section 84*a* instructs the image expanding section 84*c* to expand the binary image by the acquired size, and acquires its result (Step 803). Next, the document-image extracting section 84*a* instructs the image shrinking section 84*d* to shrink the expanded binary image by the acquired size, and acquires its result (Step 804). As a result, the inverted dot images (white dots) superimposed on the image portion of the document image are removed. In this case, if it is once known that the size of the dot image is 2 dots×2 dots, the expanding amount is set to 2 dots. By setting the expanding amount and the shrinking amount to the same size as the dot image, the document-image extracting section 84*a* can remove only the dot images from the received image (synthesized image), and elements of the document image are not removed.

Specifically, if the binary image acquired at step S801 is an image shown in FIG. 16(A), an image shown in FIG. 16(B) is a result of the steps S802 to S804. As apparent from FIGS. 16(A) and 16(B), the inverted dot images (two white dots by two white dots) in a lower right portion of the image shown in FIG. 16(A) is removed.

In addition, the document-image extracting section 84*a* instructs the image shrinking section 84*d* to shrink the binary image, on which the expanding processing and the shrinking processing have been performed, by the acquired size, and acquires its result (Step 805). Next, the document-image extracting section 84a instructs the image expanding section 84c to expand the binary image by the acquired size, and acquires its result (Step 806). As a result, the normal dot images superimposed on the image portion of the document image are removed. In this case, if it is once known that the size of the dot image is 2 dots×2 dots, the expanding amount is set to 2 dots. By setting the expanding size and the shrinking size to the same size as the dot image, the document-image extracting section 84a can extract only the dot images, and elements of the document image are not removed.

Specifically, if steps S805 and 806 are applied to the image shown in FIG. 16(B), an image shown in FIG. 16(D) is obtained. As apparent from FIGS. 16(B) and 16(D), the normal dot images (two black dots by two black dots) in an upper left portion of the image shown in FIG. 16(B) is removed.

In the above description, after the image is expanded and is then shrunk, the resultant image is shrunk and is then expanded. However, the order of processing is not limited thereto. In other words, the same result can be obtained if after the image is shrunk and is then expanded, the resultant image is expanded and is then shrunk.

For example, if the binary image input from the binary image generating section 82 is the image shown in FIG. 16(A), the image separating section 84 of the first example outputs to the EXOR operation section 85 both of (i) the image shown in FIG. 16(A) as it is and (ii) the image shown in FIG. 16(D), which is the result of the steps S801 to S806. Then, the EXOR operation section 85 performs the exclusive OR operation between the image shown in FIG. 16(A) and the image shown in FIG. 16(D). As a result, the EXOR operation section 85 obtains an image shown in FIG. 16(E). In FIG. 16(E), code pattern images are represented only with black dots (normal dot images), and the image portions of the document image are removed. That is, the code pattern generating section 83 generates the code pattern image from the binary image generated by the binary image generating section 82.

Secondly, a description will be given on the operation of the normal-dot-image removing section 84e of the image separating section 84 shown in FIG. 11C.

FIG. 12B is a flowchart illustrating the operation of the normal-dot-image removing section 84e.

First, the normal-dot-image removing section 84e acquires a binary image from the binary image generating section 82 (Step 811). Then, the normal-dot-image removing section 84e instructs the size detecting section 84b to detect the size of the dot image, and acquires the result (Step 812). The method of detecting the size of the dot image by the size detecting section 84b is the same as that already described above.

In addition, the normal-dot-image removing section 84e instructs the image shrinking section 84d to shrink the binary image by the acquired size, and acquires its result (Step 813). Next, the normal-dot-image removing section 84e instructs the image expanding section 84c to expand the binary image by the acquired size, and acquires its result (Step 814). As a result, the normal dot images superimposed on the image portion of the document image are removed. In this case, if it is once known that the size of the dot image is 2 dots×2 dots, the expanding amount is set to 2 dots. By setting the expanding size and the shrinking size to the same size as the dot image, the normal-dot-image removing section 84a can remove only the dot images, and elements of the document image are not removed.

Specifically, if the binary image acquired at step S811 is the image shown in FIG. 16(A), an image shown in FIG. 16(C) is a result of the steps S812 to S814. As apparent from FIGS. 16(A) and 16(C), the normal dot images (two black dots by two black dots) in an upper left portion of the image shown in FIG. 16(A) is removed.

Thirdly, a description will be given on the operation of the inverted-dot-image removing section 84f of the image separating section 84 shown in FIG. 11C.

FIG. 12C is a flowchart illustrating the operation of the inverted-dot-image removing section 84f.

First, the inverted-dot-image removing section 84f acquires the binary image from the binary image generating section 82 (Step 821). Then, the inverted-dot-image removing section 84f instructs the size detecting section 84b to detect the size of the dot image, and acquires the result (Step 822). The method of detecting the size of the dot image by the size detecting section 84b is the same as that already described above.

In addition, the inverted-dot-image removing section 84f instructs the image expanding section 84c to expand the binary image by the acquired size, and acquires its result (Step 823). Next, the inverted-dot-image removing section 84f instructs the image shrinking section 84d to shrink the binary image by the acquired size, and acquires its result (Step 824). As a result, the inverted dot images superimposed on the image portion of the document image are removed. In this case, if it is once known that the size of the dot image is 2 dots×2 dots, the expanding amount is set to 2 dots. By setting the expanding size and the shrinking size to the same size as the dot image, the inverted-dot-image removing section 84f can remove only the dot images, and elements of the document image are not removed.

Specifically, if the binary image acquired at step S821 is the image shown in FIG. 16(A), an image shown in FIG. 16(B) is a result of the steps S822 to S824. As apparent from FIGS. 16(A) and 16(B), the normal dot images (two white dots by two white dots) in a lower right portion of the image shown in FIG. 16(A) is removed.

For example, if the binary image input from the binary image generating section 82 is the image shown in FIG. 16(A), the image separating section 84 of the second example outputs to the EXOR operation section 85 both of (i) the image shown in FIG. 16(C), which is the result of the steps S811 to S814, and (ii) the image shown in FIG. 16(B), which is the result of the steps S821 to S824. Then, the EXOR operation section 85 performs the exclusive OR operation between the image shown in FIG. 16(B) and the image shown in FIG. 16(C). As a result, the EXOR operation section 85 obtains an image shown in FIG. 16(E). In FIG. 16(E), code pattern images are represented only with black dots (normal dot images), and the image portions of the document image are removed. That is, the code pattern generating section 83 generates the code pattern image from the binary image generated by the binary image generating section 82.

This completes the description of this exemplary embodiment.

In this exemplary embodiment, the arrangement provided is such that processing for generating a synthesized image from a document image and a code pattern image is performed by the image generating apparatus, and processing for extracting the code pattern image from the synthesized image is performed by the image processing apparatus. Accordingly, a description will be given hereafter of the configuration of hardware of a computer (the terminal apparatus 10, the document server 20, the identification information server 30, etc.) for executing these processings.

Figure 13:
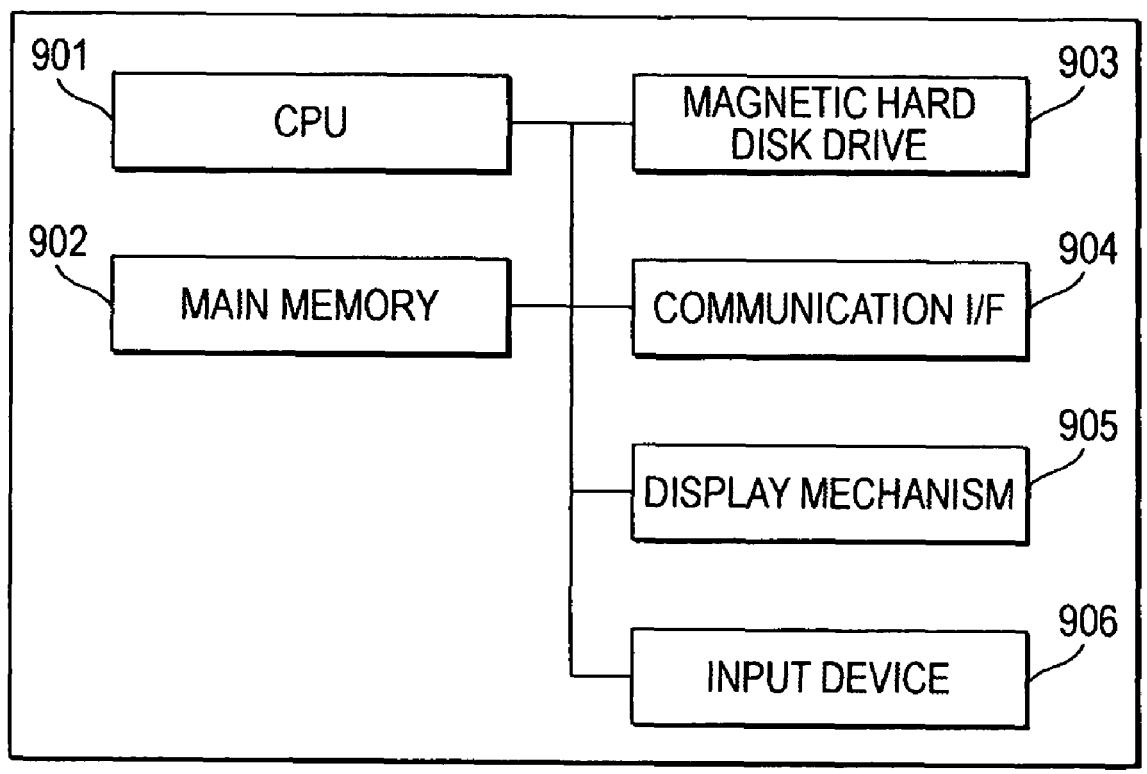
FIG. 13 is a diagram illustrating the hardware configuration of a computer for realizing the image generating apparatus or the image processing apparatus according to the exemplary embodiment.

FIG. 13 is a diagram illustrating the hardware configuration of such a computer.

As shown in the drawing, the computer has a central processing unit (CPU) 901, a main memory 902 which is a storage means, and a magnetic hard disk drive (HDD) 903. Here, the CPU 901 executes various software including the operating system (OS), applications, and the like, and realizes the above-described various functions. Further, the main memory 902 is a storage area for storing the various software and data and the like which are used in their execution. The magnetic hard disk drive 903 is a storage area for storing input data for the various software, output data from the various software, and the like.

Furthermore, the computer has a communication I/F 904 for effecting communication with an external circuit, a display mechanism 905 constituted by such as a video memory and a display, and an input device 906 such as a keyboard and a mouse.

It should be noted that although in this exemplary embodiment a description has been given of the generation and processing of an image in the system such as the one shown in FIG. 1, such a system is only one example, and the invention is not limited to the same.

In addition, although the information is encoded, is formed into an image, and is embedded in the document image as a code pattern image, it does not follow that encoding must necessarily be carried out. Accordingly, the code pattern image can also be called an information image in the sense that predetermined information is formed into an image.

What is claimed is:

1. An image generating apparatus comprising:
  a document-image acquiring section that acquires a document image, which is a binary image formed based on an electronic document;
  an information-image acquiring section that acquires an information image, which is a binary image formed based on predetermined information;
  a determination section that determines the size of image elements formed by an image forming mechanism connected to the image generating apparatus as a characteristic of the image forming mechanism; and
  a synthesizing section that performs an exclusive OR operation between the document image and the information image to synthesize the document image and the information image, wherein:
  the information image includes a plurality of image elements having a predetermined size,
  the document image includes an image portion where an image of the information is present and a background portion where no image is present,
  the synthesizing section adjusts a size of an image element of the information image synthesized in the image portion of the document image and a size of an image element of the information image synthesized in the background portion based on a magnitude relation between the size of the image element of the information image synthesized in the image portion of the document image and the size of the image element of the information image synthesized in the background portion of the document image,
  the magnitude relation being based on the size of image elements determined by the determination section,
  the synthesizing section increases a size of an image element of the information image synthesized in the image portion of the document image and decreases a size of an image element of the information image synthesized in the background portion of the document image where, based on the magnitude relation determined by the determination section, the size of the image element of the information image synthesized in the image portion of the document image is smaller than the size of the image element of the information image synthesized in the background portion of the document image, and
  the synthesizing section decreases a size of an image element of the information image synthesized in the image portion of the document image and increases a size of an image element of the information image synthesized in the background portion of the document image where, based on the magnitude relation determined by the determination section, the size of the image element of the information image synthesized in the image portion of the document image is larger than the size of the image element of the information image synthesized in the background portion of the document image.

2. The image generating apparatus according to claim 1, wherein the predetermined information includes identification information that can identify the electronic document.

3. An image generating apparatus comprising:
  a document-image acquiring section that acquires a document image, which is a binary image formed based on an electronic document;
  an information-image acquiring section that acquires an information image, which is a binary image formed based on predetermined information;
  a determination section that determines the size of image elements formed by an image forming mechanism connected to the image generating apparatus as a characteristic of the image forming mechanism; and
  a synthesizing section that performs an exclusive OR operation between the document image and the information image to synthesize the document image and the information image, wherein the predetermined information includes position information representing coordinates, wherein:
  the information image includes a plurality of image elements having a predetermined size,
  the document image includes an image portion where an image of the information is present and a background portion where no image is present,
  the synthesizing section adjusts a size of an image element of the information image synthesized in the image portion of the document image and a size of an image element of the information image synthesized in the background portion based on a magnitude relation between the size of the image element of the information image synthesized in the image portion of the document image and the size of the image element of the information image synthesized in the background portion of the document image,
  the magnitude relation being based on the size of image elements determined by the determination section,
  the synthesizing section increases a size of an image element of the information image synthesized in the image portion of the document image and decreases a size of an image element of the information image synthesized in the background portion of the document image where, based on the magnitude relation determined by the determination section, the size of the image element of the information image synthesized in the image portion of the document image is smaller than the size of the image element of the information image synthesized in the background portion of the document image, and
  the synthesizing section decreases a size of an image element of the information image synthesized in the image portion of the document image and increases a size of an image element of the information image synthesized in the background portion of the document image where, based on the magnitude relation determined by the determination section, the size of the image element of the information image synthesized in the image portion of the document image is larger than the size of the image element of the information image synthesized in the background portion of the document image.

4. A non-transitory computer readable medium storing a program causing a computer to execute a process for image processing, the process comprising:

acquiring a document image, which is a binary image formed based on an electronic document;

acquiring an information image, which is a binary image formed based on predetermined information;

determining the size of image elements formed by an image forming mechanism as a characteristic of the image forming mechanism; and performing an exclusive OR operation between the document image and the information image to synthesize the document image and the information image, wherein:

the information image includes a plurality of image elements having a predetermined size, the document image includes an image portion where an image of the information is present and a background portion where no image is present, and the step of performing an exclusive OR operation between the document image and the information image to synthesize the document image and the information image comprises the step of adjusting a size of an image element of the information image synthesized in the image portion of the document image and a size of an image element of the information image synthesized in the background portion based on a magnitude relation between the size of the image element of the information image synthesized in the image portion of the document image and the size of the image element of the information image synthesized in the background portion of the document image, the magnitude relation being based on the size of image elements formed by the image forming mechanism, the step of adjusting a size of an image element of the information image synthesized in the image portion of the document image and a size of an image element of the information image synthesized in the background portion comprises the step of increasing a size of an image element of the information image synthesized in the image portion of the document image and decreasing a size of an image element of the information image synthesized in the background portion of the document image where, based on the magnitude relation, the size of the image element of the information image synthesized in the image portion of the document image is smaller than the size of the image element of the information image synthesized in the background portion of the document image, and the step of adjusting a size of an image element of the information image synthesized in the image portion of the document image and a size of an image element of the information image synthesized in the background portion comprises the step of decreasing a size of an image element of the information image synthesized in the image portion of the document image and increasing a size of an image element of the information image synthesized in the background portion of the document image where, based on the magnitude relation, the size of the image element of the information image synthesized in the image portion of the document image is larger than the size of the image element of the information image synthesized in the background portion of the document image.

\* \* \* \* \*